Inventors
Herbert T. Leo
Clarence C. Taylor

Oct. 4, 1949.  H. T. LEO ET AL  2,483,549
PREPARATION OF PECTOUS JELLIES
Filed March 20, 1944  3 Sheets-Sheet 2

INVENTORS
Herbert T. Leo
Clarence C. Taylor

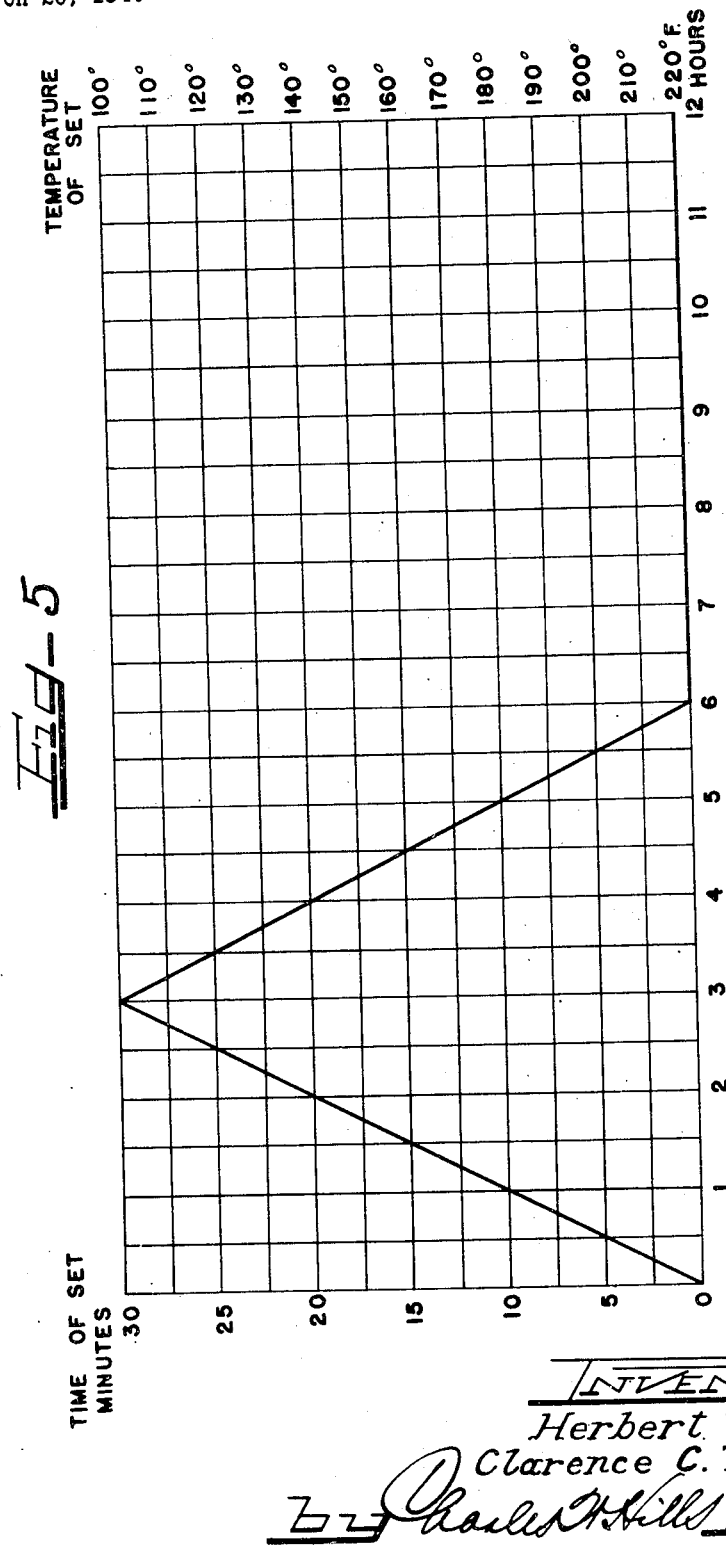

Patented Oct. 4, 1949

2,483,549

UNITED STATES PATENT OFFICE 2,483,549

PREPARATION OF PECTOUS JELLIES

Herbert T. Leo and Clarence C. Taylor, Anaheim, Calif.

Application March 20, 1944, Serial No. 527,235

13 Claims. (Cl. 195—7)

This invention relates to compositions containing chemically modified pectin, to methods of preparing pectous jellies from such compositions, and to jellies prepared by such methods. More particularly, the invention pertains to pectin modified by enzymatic action and to jellies prepared from thus modified pectin.

Fig. 5 shows the time of set of pectinylic acid.

Figure 1:
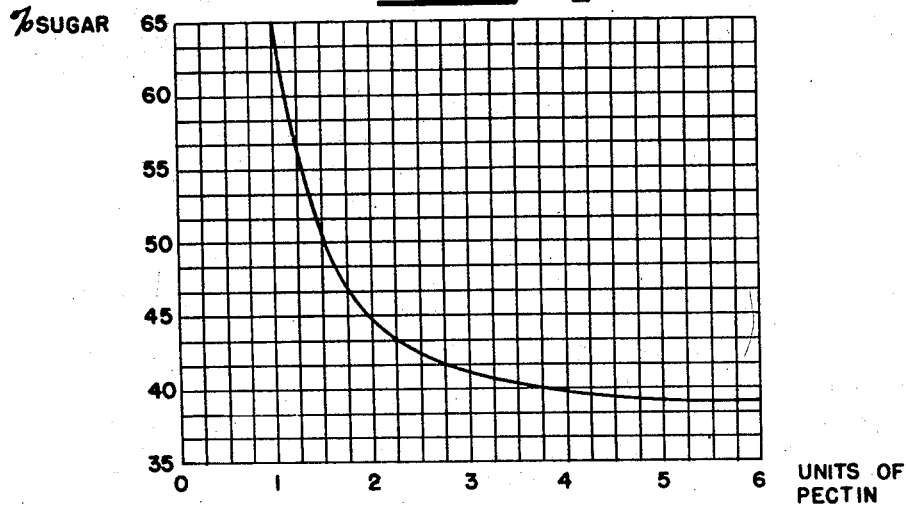
Fig. 1 shows the relation of sugar concentration to pectin in gels.

Pectous substances can be isolated from many vegetable materials, for instance, carrots, sugar beets, flax, plums, berries such as strawberries, tomatoes and the like. The usual raw materials for commercial production of pectin include apple pomace and the albedo or rind of citrus fruits, in particular, rinds of lemons, limes and oranges. In apples, as well as in citrus fruit material, pectin is present in the form of a water insoluble composition commonly referred to as protopectin. For the purpose of isolating water soluble pectin from vegetable material, in particular, from the above indicated fruit material, such fruit material is conventionally subjected to an initial extraction by means of an acid aqueous medium followed by a separation of the resulting extract from the residual fruit pulp. This extraction with an acid aqueous medium is usually carried out at an elevated temperature and apparently effects a more or less complete hydrolysis of the protopectin with the formation of water soluble pectin that is dissolved by the acid aqueous extracting medium. The separated pectous extract usually contains upward from 0.5% pectin which is subsequently isolated according to one of several available methods.

For instance, pectin has heretofore been isolated from a pectous extract by the addition to the extract of an alcohol, such as ethyl alcohol or isopropyl alcohol, whereby alcohol-water mixtures are formed in which pectin is insoluble. Such precipitation by means of alcohol, however, is not favored by those skilled in the art as much as another precipitation method involving the precipitation of aluminum hydroxide in the pectous extract. The precipitated aluminum hydroxide takes large amounts of pectin out of solution. The coprecipitate of aluminum hydroxide and pectin may be separated from the mother liquor in which it is formed and washed with acidified aqueous alcohol for the purpose of selectively removing the aluminum hydroxide. The pectin, being insoluble in aqueous alcohol, retains its solid form throughout the washing procedure and may subsequently be dried and ground, the dried and ground washed pectin representing the finished product. A preferred method for isolating pectin from an extract by means of precipitation of aluminum hydroxide in said extract is disclosed in our copending application, Serial No. 509,794, filed November 10, 1943, and entitled "Method of preparing pectin," now abandoned.

In view of the apparent fact that alkaline media affect pectin so vigorously that reaction in these alkaline media is difficult to control, with the result that so-called "pectic acid" is formed, prior art workers have not investigated in any great detail the problems connected with the use of pectin treated with alkaline media for the preparation of jellies by means of acid sugar solutions or by means of calcium compounds. In the case of pectin treatment with acid media, on the other hand, the action of acid media on pectin is more easily controlled, and more interest has been shown in the preparation of jellies from acid treated pectins. However, no satisfactory method has heretofore been offered for coordinating and correlating the jelling of pectin effected at suitable sugar concentration in conjunction with proper pH condition and the jellying effected by formation of calcium precipitates. This situation is due to an incomplete and erroneous understanding by prior art workers of the proper methods for preparing calcium precipitable pectins and of the methods to be used for forming jellies with calcium precipitable pectins. The invention of the present application relates particularly to pectins having relatively low temperatures of set and to calcium precipitable pectins and provides jelly forming compositions containing such pectins as well as methods for preparing pectous jellies formed from pectin having a relatively low temperature of set and, in particular, calcium precipitable pectins.

In view of the fundamental differences between the pectous products designated by the prior art workers as "pectinic acid" and produced on one hand, by acid treatment, and on the other hand, by pectase treatment, the present applicants, in this application, will hereinbelow restrict the term "pectinic acid" to include only the gel forming pectous bodies obtained by acid treatment. The new term "pectinylic acid" will be used hereinbelow to indicate pectous bodies obtained by treatment of pectin with pectase. The term "pectinylic acid" is further restricted to exclude pectous bodies exposed to pH values above 5 effected by alkalis for a period long enough to modify the properties of such pectous bodies. Such modification can be detected by the jellying tests described in this application.

The present invention relates particularly to jelly forming compositions containing pectinylic acids, to jellies formed from pectinylic acids and to methods for preparing such jellies.

An important object of this invention is to provide jelly forming compositions, jellies and methods for preparing jellies involving pectinylic acids.

A specific object of this invention is to provide pectinylic acid jellies and methods for preparing such jellies in which a calcium-pectinylic acid precipitate is an essential ingredient.

Other and further objects and features of this invention will become apparent from the following description and appended claims.

Figure 2:
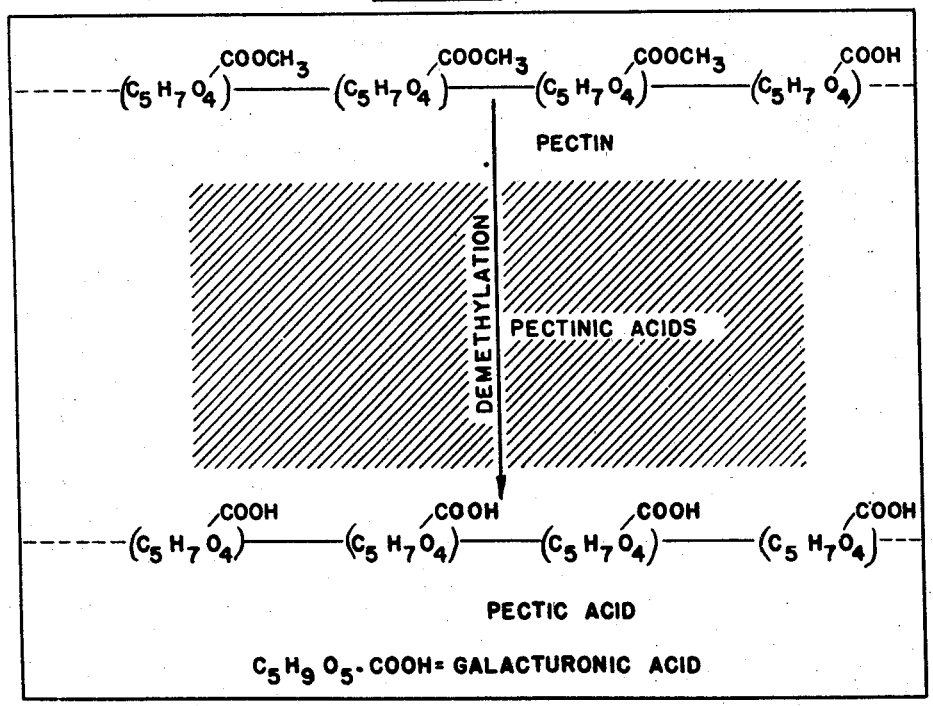
Fig. 2 shows the relation between pectin, pectinic acids and pectic acid.
Figure 3:
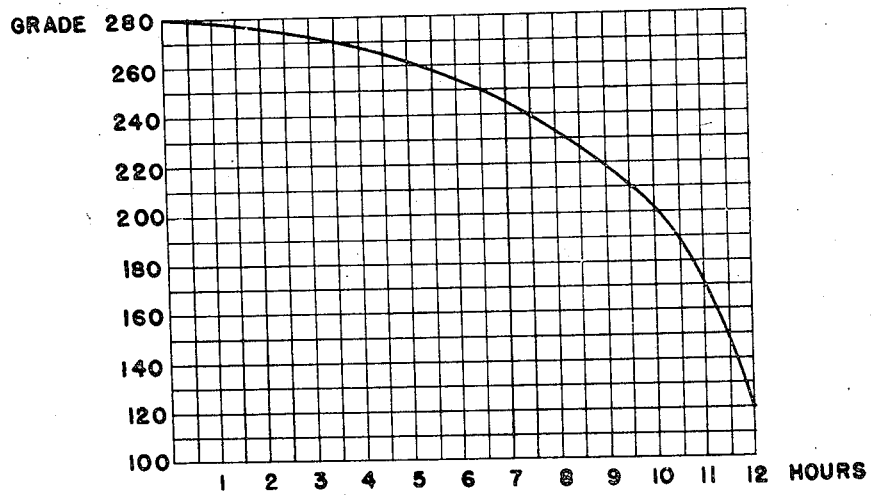
Fig. 3 shows the action of pectase on pectinylic acid.
Figure 4:
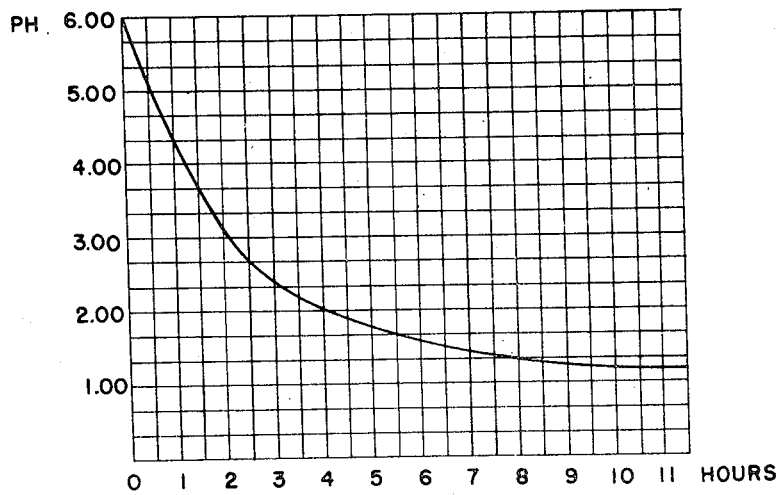
Fig. 4 shows the effect of pectase action in lowering the pH on pectinylic acid calcium gels.

Figure 1 shows the relation of sugar concentration to units of 65 grade pectin in gels having the same texture;

Figure 2 shows the relation between pectin, pectinic acids, and pectic acid;

Figure 3 shows the effect of the progressive treatment of pectin with pectase on the grade of the resulting pectinylic acids;

Figure 4 shows the progressive lowering of the pH value at which the calcium jelly of the pectinylic acids can be dissolved as pectase action progresses;

Figure 5 shows the "time of set" and "temperature of set" of the pectinylic acids prepared by the reaction of pectase on pectin over indicated periods of time.

It has long been known that the commonly occurring enzyme, generally termed pectase, can split off methyl alcohol from pectin in solution. If, moreover, calcium salts are present in sufficient amounts (as in fruit juices), a jelly is formed which has usually been thought to consist of the calcium salts of the "pectic acid" resulting from this supposed demethoxylation.

This combined effect of pectase and of calcium is partly responsible for the familiar phenomenon of the natural gelling of certain fruit juices when pressed and drained out from the fruit. This phenomenon is especially noticeable in black currants and raspberries, and it has been observed in the case of gooseberries when these are crushed and allowed to stand for some hours before the juice is pressed out. The same cause also appears to be responsible for the occasional formation of a jelly in sulfited fruit pulp. In such cases as with the fresh juices, it seems probable that a separate enzymic action first liberates the pectin in a soluble form from the cell wall substance, and the pectin is then attached by the pectase. The sulfurous acid does not suppress the activity of these enzymes. Possibly the reason why no gelling occurs in undamaged fruit is because the pectin precursor (protopectin) in the cell wall is segregated in some way from the enzymes before the fruit tissue is ruptured.

We have found that in the preparation of pectinylic acids, provision must be made for maintaining a suitable pH value by agents other than alkalis. Further, provision must be made for a sharp termination of the pectase action, and such sharp termination should be effected at definite stages in the pectase action according to the nature of the produce desired. Finally, provision must be made for removing all but definite small amounts of calcium and/or other polyvalent metal compounds admixed or combined with the pectinylic acids. All these precautions are important due to the fact that the gelling properties of pectinylic acids are controlled by these steps. We will describe in this application both our novel method of preparing pectinylic acids and the various products thus obtained as well as the methods to be used for preparing jellies from the various pectinylic acids that can be prepared according to our novel enzymatic method. Such disclosures are required to show the significance of the use, for jelly making purposes, of pectinylic acids prepared by methods including various steps disclosed in this application.

By the term "pectase" we mean an enzymic material derived from a suitable biological or vegetable source and capable of acting on soluble pectin to convert the pectin partially or completely into the products designated as pectinylic acids. Whether or not pectase includes only a single enzyme or a group of enzymes is not definitely known. For this reason, the term "pectase" is used in this application to cover both any single enzyme and any mixture of enzymes capable of acting on soluble pectin with the above mentioned results.

We have found that rapidly growing vegetable material provides a rich source of pectase. Specific examples are the sprouts of the tobacco plant and the growing plants of the legume family, particularly clover and alfalfa. However, when infusions of growing leguminous plants are prepared, as by grinding or otherwise breaking up growing leguminous plants, maceration of the crushed material with water and separation of the resulting infusion of extract from residual solid material, the resulting infusion or extract contains in suspension relatively large amounts of finely divided solid particles containing a green coloring matter believed to be chlorophyll. This finely divided residual matter cannot easily be separated from the infusion or extract and, when the infusion or extract is used to modify soluble pectin, tends to color this pectin as well as the products derived from the pectin by the action of the pectase, to confer on the treated material and the products of reaction an objectionable green color.

We therefore prefer to use pectase free from objectionable coloring bodies.

The pectous material treated with such a pectase solution is preferably a filtered pectin extract obtained from suitable citrus or other fruit material by extraction with an acid aqueous medium as described, for instance, in our application Serial No. 509,794. Such extract usually contains from one-half to one percent of pectin, and most often about 0.75% pectin. Although such thin or dilute pectin extracts or liquors may be treated according to the methods of our invention with good results, we prefer to treat concentrated pectin solutions such as a pectin extract concentrated from 2 to 1 or as much as 4 to 1. The concentrated extract discussed hereinbelow by way of example contains about three times as much pectin as the original extract prior to concentration. The concentrated pectin extract is quite fluid.

We have discovered that pectase is best allowed to act on such concentrated pectin solutions at a pH of from 5.5 to 6.5. We have further found that as the pectase action progresses, acid is liberated in the reacting mass and that the enzyme action is correspondingly decelerated. To maintain a suitable pH value throughout the enzyme action, for instance, about 6.00, we add a sufficient amount of chalk to the pectin concentrate. In the case of a pectin solution having a concentration such that one gallon of pectin concentrate is capable of gelling 37½ pounds of sugar at 65% sugar concentration, we have found that from eleven to eighteen grams of chalk per gallon of concentrate will be sufficient. As a rule fifteen grams of chalk suffice to maintain a pH value of about 6.0. This pH value is maintained even though the pectase action may be continued for as long as twelve hours.

To one gallon of pectin concentrate which originally has a pH of about 3.00 and contained no added acid, we thus add fifteen grams of chalk suspended in a small amount of water to effect a pH value of about 6.00.

To one gallon pectin concentrate containing added chalk there may be added one pint of the above described alfalfa extract, and the resulting mixture is stirred well to effect complete intermixing.

As the enzyme action progresses in the originally fluid pectin solution, a light jelly forms within fifteen or thirty minutes, and this jelly becomes progressively firmer until the jelly can withstand considerable pressure. At four hours the jelly may be as firm as brick cheese. However, it is not possible to judge the progress of the reaction by the appearance and change of texture in the jelly, although, if the process is caused to take place in jelly glasses, increasing firmness can definitely be noted by turning out one glass each hour and testing the jelly for firmness. All of such jellies are in fact "low sugar" or practically "no sugar" jellies.

We have found that one pint of an alfalfa infusion will convert a gallon of pectin extract concentrated to a ratio of 3 to 1 as rapidly as the same pint would convert the original more dilute extract, if the pH value is maintained at about 6.00. This rapid rate of conversion is maintained even though three times as much acid may be released by the enzyme in the case of the concentrated extract. This liberated acid is neutralized by the calcium carbonate added to the pectin extract prior to the initiation of the enzyme action.

We find that there is an optimum temperature of enzyme action at about 100° F. The enzyme is not killed below 155° F. Since calcium carbonate, particularly in the form of precipitated chalk, does not adversely affect the pectin at a temperature of 150° F., the enzyme action may be conducted through a wide range of temperatures.

For terminating the pectase reaction, any fluid may be removed from the jelly formed by the action of the pectase, and the jelly is then disintegrated or comminuted by grinding or, preferably, by forcing the jelly through a coarse screen or similarly apertured means. Such disintegration or comminution of the jelly facilitates penetration of the jelly by the high strength alcohol into which the jelly is introduced for the purpose of terminating the pectase action. The strength and amount of the alcohol into which the disintegrated jelly is dropped should be such that the alcohol concentration of the resulting mixture is preferably between 40 and 50%. At such alcohol concentration, the jelly particles are dehydrated to a considerable extent. Acid is incorporated with the alcohol, preferably after the disintegrated jelly has been dropped into the alcohol, in an amount such as to effect the pH value in the resulting mixture of 1.00 or less. Preferably, the pH value is reduced to at least 0.75. The purpose of the acidification is to remove from the jelly all but the small amount of calcium specified hereinbelow. For this reason, acids are used that form soluble calcium salts, in particular, hydrochloric acid. Any alcohol may be used in which calcium chloride or other calcium salts formed during the washing is soluble. When the alcohol concentration is between 40 and 50%, we find that the jelly is easily penetrated by the acidified alcohol to effect the desired removal of calcium compounds.

This washing with acidified alcohol is followed by washing with unacidified alcohol and is carried out so thoroughly that one gram of the resulting washed and dried pectin will be soluble in 100 c. c. of distilled water at a temperature of 130° F. This solubility corresponds to a maximum ash content of 2.8%. The significance of this thorough washing will be apparent from the explanations made hereinbelow. Ordinarily one acid alcohol wash at a pH of from 0.60 to 1.00 is sufficient to reduce the ash content to 2.8%, when coupled with subsequent rinses with alcohol carried out until the pH value of the rinsed pectous matter is about 3.00. Such washing with unacidified alcohol is carried out to remove from the acid alcohol washed pectin, calcium chloride and acid reacting matter left therein after the acid alcohol wash.

After the alcohol washing, the pectous solids are pressed, dried in vacuo and preferably ground to 100 mesh size.

We have found that washing the pectous jelly obtained by pectase treatment to reduce its ash content to below 2.8% will permit ready solution of the washed modified pectin, even when treated for as long as twelve hours in the manner disclosed hereinabove, to form a 1% solution in distilled water at 130° F. without the use of any calcium precipitating agents. This solution will have a natural pH value ranging from 2.90 to 3.20.

The time at which pectase action is to be terminated depends upon the nature of the product desired. For this reason it is necessary to disclose the nature of the changes in the pectin affected by the progressive action of pectase under the above descibed conditions and the significance of these changes in relation to the utilization of the resulting modified pectins for various purposes.

Reference is made to Figure 4 showing the progressive lowering of the pH value at which the calcium jelly can be dissolved as pectase action progresses. These data were obtained in treating a pectin extract concentrated at a ratio of 3 to 1, 15 grams calcium carbonate and 1 pint alfalfa extract having been added to this pectase concentrate, as described hereinabove. The pH value of the concentrate is maintained throughout the pectase action at a value ranging from 5.50 to 6.20 by the added chalk. The pectin concentrate was made from lemon peels cooked with hydrochloric acid at a pH value of from 2.40 to 2.60 and then neutralized with calcium carbonate to a pH value of 3.00 and filtered. This extract was concentrated in vacuo from three gallons to one gallon. The alfalfa extract was made by macerating two pounds green alfalfa and one gallon of water, pressing and filtering the extract. During the pectase action the temperature of the concentrate was maintained at approximately 100° F.

In determining the progress of the pectase reaction, we take small samples of the calcium jelly formed as a result of the pectase action and break up this jelly, adding a small amount of distilled water thereto. To the resulting suspension in distilled water of the calcium-pectin jelly we add gradually increasing amounts of acid until solution of the jelly particles becomes evident. For acidifying the aqueous suspension of calcium-pectin jelly, we have used an acid solution made up of 50 c. c. 80% U. S. P. lactic acid, 50 c. c. 37% chemically pure hydrochloric acid and 400 c. c. of distilled water. This combination of acids has been found convenient because both the acids form water soluble salts and further, the pH values may more easily be controlled by such a combination of a relatively weak and a relatively strong acid.

Disintegration of the calcium-pectin jelly may be effected by grinding the jelly with distilled water in a glass mortar and adding the hydrochloric acid-lactic acid mixture until solution takes place. Care must be taken not to lower the pH value too rapidly, in order to give the larger lumps of jelly time to dissolve. The appearance of the liquid will indicate when solution is taking place.

In the earlier stages of the treatment solution takes place quite rapidly. As pectase action progresses toward the eight hour period, solution takes place more slowly and finally, at about 12 hours, a point is reached at which the pectin jelly does not go into complete solution at a pH value of 1.00 or less. We surmise that at this point the calcium content of the pectin jelly may be dissolved but that the pectin itself has been so far modified that it no longer is soluble in acid media.

Figure 4 shows the correlation between time of treatment and the pH value required to redissolve the calcium-pectin jelly formed during the pectase action. It is confined to the specific conditions of pH value, pectin concentration and pectase concentration and temperature indicated hereinabove. The reaction may be speeded up or decelerated by using other pH values, pectin concentrations, pectase concentrations and temperatures. In general, lower pH values, lower temperatures and smaller concentrations of pectase will decelerate the reaction.

As shown by Figure 4, the progressive action of pectase on pectin with the formation of pectinylic acid renders the pectinylic acid more and more susceptible to precipitation by calcium compounds. Or, the pectinylic acid combines with or absorbs calcium more strongly, so that lower and lower pH values are required to dissolve the precipitate formed by the action on pectinylic acid of soluble calcium compounds.

Accompanying this increase in calcium susceptibility is an increase in viscosity of the aqueous solutions of pectinylic acid prepared in distilled water. Pectinylic acid obtained by the treatment described hereinabove and continued for from 8 to 12 hours yields a product that after solution with distilled water at 130° F. sets on cooling to form a gelatinous product. When pectinylic acid is prepared as described hereinabove and washed to a maximum ash content of 2.80%, the viscosity of the pectin solutions in distilled water reaches a maximum at a pH value very close to 3.00. It should be mentioned in this connection that pectinylic acid prepared and isolated as described hereinabove has a natural pH value, when dissolved in distilled water, ranging from 2.90 to about 3.20. Pectinylic acids prepared as described hereinabove by the action of pectase on pectin for periods of time as long as 18 hours or longer, when washed with alcohol acidified with hydrochloric acid and rinsed with alcohol to lower the ash content to about 2.8%, are all perfectly soluble in distilled water, and require no calcium precipitating agents, such as sodium citrate, tartrate, phosphate or oxalate, for solution.

Figure 3 illustrates the effect of the progressive treatment with pectase on the grade of the resulting pectinylic acids. As shown on this graph, after pectin of known grade (280 grade) is dissolved in distilled water to form jellies containing 65% sugar at a pH value of 2.50, the jelly grade is lowered slightly during the first few hours, being lowered more rapidly during the last hours of treatment until after about twelve hours the grade has decreased by about 50% or more.

Figure 5 shows the "time of set" of pectinylic acids prepared by treatment with pectase for periods of time as long as twelve hours. In determining the "time of set," jellies were prepared from pectinylic acid using a small amount of sodium citrate at a 65% sugar content and a pH value of 2.50. The water used contained 80 parts per million of calcium. The "time of set" is defined as the time required for the pectin composition to set to jelly in 8 ounce glasses as measured in minutes. The corresponding temperatures of set at this pH value are also shown graphically. As shown by this graph, the temperature of set is lowered, during the first three hours of treatment, from 220° F. to 100° F. During the next three hours, the temperature of set is again raised to 220° F. and remains at this point for the last six hours of treatment. In other words, the jellies will pre-set in the kettle at six hours or longer treatment.

In the setting of the pectinylic acid obtained by treatment ranging up to three hours, the presence of a trace of calcium has little or no effect on the temperature of set. In the setting of the pectin jellies obtained as the result of treatment ranging from three to six hours, the setting seems to be effected both by the sugar and pH values and by the calcium present. After six hour treatment, the formation of jellies seems to be due exclusively to the formation of calcium precipitates. This theory has been verified by the preparation of the corresponding jellies in the absence of any calcium, when the curve is obtained similar to that shown in Figure 3, and in which there is a progressive lowering in temperature of set without any final rise. It should be noted, however, that pectins having a temperature of set at room temperature at a pH value of 2.30 form the approximate limit of usefulness for the purpose of preparing jellies containing 65% sugar without depending on the formation of calcium precipitate.

We tabulate hereinbelow the pH values required for dissolution of the calcium jelly formed in the above described specific example of treatment of pectin with pectase to form pectinylic acid:

| Time of Treatment | pH Required For Dissolution of Jelly |
|---|---|
| 0 | 6.0 |
| 1 | 4.4 |
| 2 | 3.1 |
| 3 | 2.4 |
| 4 | 2.1 |
| 5 | 1.9 |
| 6 | 1.6 |
| 7 | 1.5 |
| 8 | 1.4 |
| 9 | 1.3 |
| 10 | 1.2 |
| 11 | 1.1 |
| 12 | 1.0 |

With respect to the pectin treated for 12 hours, it should be noted that complete dissolution of the jelly is not effected at a pH of 1.0. The "pH required for dissolution of jelly" mentioned in this application should be interpreted accordingly.

It should be understood that there is an equivalency between any treatment with pectase in a medium having a suitable pH value induced by the presence of calcium, magnesium compounds or the like, and not due to alkali compounds, which will effect the formation of a calcium jelly requiring a pH for dissolution of the jelly equal to any one of the numbers on the right-hand column of the above table and a treatment effected under the above illustrated specific conditions for a time specified in the above table as required to effect the minimum pH value in question.

It should further be understood that, if desired, the pectase action may be terminated, for instance, by heating to above 160° for a time sufficient to kill the enzyme, followed, at any desired interval of time, by the above described washing with acidic alcohol for the purpose of reducing the ash content of the pectinylic acid at least to 2.80%.

In the subsequent part of the present application, the extent of pectase treatment of any given pectinylic acid will be referred to in terms of pH value required for dissolution of sugar free calcium jellies.

We have found that in the case of pectinylic acids requiring pH value of 2.40 or below for the dissolution of their calcium jellies, such pectinylic acids should not be exposed to elevated temperatures for any prolonged period of time at pH values of 4.50 or higher due to alkali compounds. In the case of pectinylic acids requiring a pH value of about 1.6 for the dissolution of their calcium jellies, such pectinylic acids should not be exposed for any prolonged period of time at elevated temperatures to a pH value of 5.30 or higher due to alkali compounds. In the case of pectinylic acids requiring a pH value of 1.0 or below for dissolution of their calcium jellies, such pectinylic acids should not be exposed for any prolonged period of time at elevated temperatures to pH values of about 6.00 up to 7.00 due to alkali compounds. Exposure of these pectinylic acids to pH conditions above the specified values at elevated temperatures for a prolonged period of time will destroy part or all of the jellying properties of the pectinylic acids.

In making jellies from pectinylic acids, care must be taken not to exceed the above specified maximum permissible pH values in the kettle.

Jellies may be prepared in conventional manner with acid sugar solutions without depending on the formation of a calcium precipitate from pectinylic acids treated up to the point where the pH of set has been reduced to 2.30 at room temperature.

In the preparation of jellies from pectinylic acids by the dehydrating effect of sugar at a suitable acid pH value, the calcium content of the water used for preparing the sugar jelly is kept at less than ten parts per million in the case of pectinylic acids requiring a pH value of 2.40 or less for the solution of their calcium jellies. The reason for this precaution is that in the case of pectinylic acids requiring a pH of 2.40 for solution of their calcium jellies, mere traces of calicum cause an increased viscosity and a semblance of premature set in the kettle. As shown by the data relating to 65% sugar jellies graphically illustrated in Figure 5, pectinylic acids requiring a pH of less than 2.4 for solution of their calcium jellies have their temperature of set raised by the presence of a trace of calicum. In the case of pectinylic acids requiring a pH of 1.6 or less for the solution of the calcium jelly, jelling in the kettle will take place in the presence of a trace of calcium (10 parts per million or more) under pH conditions otherwise conducive for formation of a high sugar jelly. By the term "high sugar jelly" we refer to a jelly containing 40 or more percent sugar by weight. All pectinylic acids requiring a pH of 1.6 or less for solution of the calcium jelly will ordinarily jell instantly in the kettle at a pH of 2.50 in the presence of a trace of calcium (10 parts per million or more) even in the presence of 20% by weight of the pectin of sodium citrate. Even if jellying does not take place in the kettle when 65% sugar jellies are prepared from pectinylic acids with tap water the viscosity becomes so great that the resulting heavy syrup tends to be burned in the kettle, in spite of the presence of 20% sodium citrate.

If a pectinylic acid is used requiring a pH value of 2.40 or less for the solution of its calcium jelly, formation of a calcium precipitate in the kettle is prevented by the use of water containing less than 10 parts of calcium per million when ordinary high sugar jellies are prepared. Alkali salts of weak organic acids forming insoluble calcium salts may also be used to prevent calcium precipitation of the pectinylic caid, coupled, if desired or necessary, with the addition of suitable reagents for controlling the pH value of the jelly batch. Such addition of calcium precipitable salts is particularly advisable when using pectinylic acids requiring a pH value of 1.6 or less for solution of their calcium jellies, even when calcium free water is used.

In preparing jellies from pectinylic acids in which the formation of gel is due partially or completely to the formation of a calcium precipitate, we use pectinylic acids requiring a pH value of less than 2.4 for the solution of their calcium jellies. As shown by Figure 5, pectinylic acids requiring a pH value of between 2.4 and 1.6 for solution of their calcium jellies can be made to form jellies at 65% sugar content and appropriate acid pH values in the absence of a trace of calcium. But if under these conditions a trace of calcium is present, the temperature of set of such pectinylic acids is raised due to the formation of calcium precipitate, which contributes to the structure of the jellies formed from these pectinylic acids under the indicated conditions.

In the preparation of jellies from pectinylic acids in which the formation of a calcium precipitate is depended on entirely for gel formation, care must be taken to prevent formation of a jelly in the kettle or within too short a time after the jelly has been poured. As shown by Figure 5, jelling in the kettle will occur at 65% sugar concentration and a pH of 2.50 if a sufficient amount of calcium is available in the kettle for the formation of a calcium precipitate, and the pectinylic acid being used requires a pH value of 1.6 or less for solution of its calcium jelly.

Our method for controlling the available calcium in the kettle involves the use of water containing not more than ten parts per million of calcium. Calcium is introduced into the jelly batch in the form of a calcium salt insoluble at relatively high pH values but gradually dissolved at lower pH values. Examples of such salts are the phosphate, carbonate and citrate of calcium. Tricalcium phosphate, for instance, is insoluble at relative high pH values, being converted at relatively low pH values into $CaH_2(PO_4)_2$ which is soluble and provides sufficient calcium to effect the formation of a precipitate in the presence of pectinylic acid. At a pH of 5.80 or higher tricalcium phosphate is so insoluble that even in the case of the most calcium susceptible pectinylic acids no precipitate will form, because calcium ions are not present in sufficient numbers to reach the insolubility point of calcium pectinylate. Pectinylic acid requiring values for solution of calcium jelly down to 1.6 are not so susceptible to calcium, and therefore a pH value as low as 4.20 can be maintained in the presence of an excess of tricalcium phosphate without formation of sufficient calcium ions to precipitate the calcium and pectinylic acid from solution. A sufficient amount of acid is introduced into the jelly batch just before or at the moment of pouring to lower the pH value to a point where calcium ions are liberated in sufficient numbers to cause setting within a suitable period of time. The acid may be introduced into the containers into which the jelly batch is poured.

We have indicated hereinabove that pectinylic acids have their gelling properties destroyed at a pH value due to alkali compounds and exceeding specified values depending upon the extent of pectase action. Care must always be taken not to exceed these maximum permissible pH values. In the presence of an excess of tricalcium phosphate, care must also be taken not to exceed the pH values specified in the preceding paragraph, if gelling in the kettle is to be avoided. When tricalcium phosphate has been introduced into a jelly batch, we therefore maintain in the kettle, in the case of pectinylic acids requiring pH values ranging from 6.0 to 1.6 for solution of their calcium jellies, a minimum pH value of 4.20 and a maximum pH value ranging from 4.50 to 5.30. In the case of pectinylic acids requiring for solution of their calcium jellies, pH values ranging from 1.6 to 1.0, a minimum pH value must be maintained in the kettle of 5.80, and a maximum pH value ranging from 6.00 to 7.00.

Tricalcium phosphate is itself a buffer salt, so that there may be times when quantities of an acid, such as citric or tartaric acid, must be added to the mixture treated in the kettle to reach the pH desired.

There are also times when a calcium precipitating salt is not sufficient to raise the pH value to the point desired, so that sodium bicarbonate or the like must be added. For instance, in the case of a pectinylic acid requiring a pH value of 1.4 or less to dissolve its pectin jelly, the following formula may be used:

| | Grams |
|---|---|
| 250 grade pectinylic acid requiring a pH value of 1.4 or less to dissolve the calcium jelly | 100 |
| Sodium citrate | 50 |
| Sodium bicarbonate | 10 |
| Dextrose | 90 |
| 100 grade pectin, total | 250 |

2 grams of this powder in 100 cc. of distilled water will give a pH of 5.80. In the city water obtainable in Anaheim, California, which contains 80 parts per million of calcium, two grams of this powder in 100 cc. of water will effect a pH value of 6.05.

In preparing jellies by precipitation of a pectinylic acid with calcium, we incorporate with the pectinylic acid sodium citrate, tartrate, phosphate or like sodium salts of weak acids forming insoluble calcium salts, for the purpose of preventing premature precipitation due to such small amounts of calcium as may be contained within the 2.80% or less ash present in the pectinylic acid. The amount of sodium citrate used may be about 20% by weight of 100 grade pectinylic acid. This sodium citrate or its equivalent is not added for use as a buffer salt to control the pH value, but is added solely for the purpose of preventing precipitation of a calcium jelly by reduction of the calcium present into insoluble form. As pointed out hereinabove, citric acid or sodium bicarbonate or the equivalent of these two substances are added to effect the desired pH value, which is tested by dissolving, in 100 cc. of distilled water, two grams of pectinylic acid reduced to 100 grade and containing 20% sodium citrate. The desired pH values in the kettle in this test are, in the case of pectinylic acids requiring for solution of their jellies a pH value not less than 2.4, a pH of 4.50; in the case of pectinylic acids requiring for solution of their calcium jellies a pH value of between 2.4 and 1.6, a pH value of 5.30; and in the case of pectinylic acids requiring for solution of their calcium jellies a pH value of 1.6 to 1.0, a pH value of 6.00 to 7.00.

We have found that the ratio 1 part tricalcium phosphate to 20 parts of pure 250 grade pectinylic acid will give a calcium solution sufficiently concentrated to set a jelly at a pH value ranging from 3.60 to 4.0 in the case of a pectinylic acid requiring a pH of 1.0 or less for the solution of its calcium jelly, and at pH values as low as 3.0 in the case of pectinylic acids requiring for solution of their calcium jellies a pH value of not less than 1.6. If lower final pH values are brought about by the addition of acid, the large amount of added acid may slow up or inhibit jelly formation. Such jelly base mixtures having pH values as low as 3.0 will remain fluid under the indicated pH conditions at kettle temperature and will set when cooled. The pH values referred to in this paragraph are not those prevailing in the kettle during the cooking of the batch but relate to the pH values effected by the addition of setting acid for liberating calcium in soluble form from the tricalcium phosphate.

In other words, calcium precipitation is controlled when water containing less than 10 parts of calcium per million is used and in the case particularly of pectinylic acids requiring a pH value of 1.6 or less for solution of their calcium jellies, by the use of edible calcium precipitating salts for preventing calcium pectinylate precipitation during cooking of the batch; by the addition of calcium salts insoluble at the pH values prevailing in the kettle; and by the addition of acids to depress the pH values in the kettle when the cooked batch is to be poured. The same results may be obtained by reversing the order of addition of the acid and the tricalcium phosphate. The jelly batch, in the latter instance, is maintained at the pH values specified in the preceding paragraph, and tricalcium phosphate (preferably in aqueous suspension) is added last. At all times, and in all events, the pH value in the kettle is kept high enough to prevent jelling in the kettle before pouring and low enough to avoid damage to the pectin due to alkali compounds.

Thus it will be seen that it is a simple matter when practically calcium free water is used, to prepare a standardized jelly formula for any pectinylic acid by including 20% sodium citrate in 100 grade pectinylic acid and by using a maximum of one part of tricalcium phosphate to 20 parts of pure 250 grade pectinylic acid, and maintaining final pH values ranging no lower than 3.00 to keep the batch in solution at boiling temperature. In this way jelly formation is prevented until the mass is cooled off to the temperature of set. Practically all pectinylic acids have temperatures of set due to calcium precipitation that can be controlled by adjustment of pH conditions to fall below the kettle temperature so that jelly formation will take place at a temperature below the kettle temperature.

The calcium intended for formation of calcium-precipitate may also be introduced in the form of other compositions than the relatively insoluble calcium salts mentioned hereinabove, as long as the calcium is not made available all at once with formation of a jelly in the kettle. While the maximum pH limits due to alkali compounds must not be exceeded, jellies may be prepared at these maximum limits, if calcium is available in not excessive amounts at these rather high pH values. Milk, for instance, may be used as a source of calcium at a pH value of about 7.00, if a pectinylic acid is used that requires a pH value of about 1.0 for solution of its calcium jelly.

If no significant amounts of ordinary sugar (less than 40%) are used for jelly formation and calcium salts are not added as such to furnish available calcium at a suitable pH value, the above disclosed directions as to the calcium content of the water used for preparing calcium jellies containing significant amounts of sugar need not always be followed. For instance, it is not necessary to employ practically calcium free water as long as the specified amount of sodium citrate or other edible calcium precipitating salt is incorporated with the pectinylic acid. Tap water may be used. Many fruit juices contain sufficient calcium for jelly formation with pectinylic acids. A specific example of the preparation of a calcium jelly having a pH value of about 7.0 is given in the following paragraph.

The above disclosed standard 100 grade pectinylic acid requiring a pH value as low as 1.00 for solution of its calcium jelly and containing 20% sodium citrate, sodium bicarbonate and dextrose may be used to prepare a jelly from milk without the addition of other gel forming ingredients. For instance, two level teaspoons of the above disclosed 100 grade pectinylic acid may be dissolved in 4 fluid ounces of hot tap water. Complete solution of the pectinylic acid will occur in spite of the calcium content of the tap water. One pint of milk is heated to just below scalding (150° F.) and mixed with the hot pectin solution. When cooled, this entire mass will set to a custard-like jelly. Sugar and a great variety of flavors may be added for palatability only. The addition of an egg beaten into the milk (one egg to each pint) gives a better textured custard and one that will not exhibit syneresis (shedding of liquid).

In milk, the calcium has been thought to be present in loose combination with casein, possibly as a lactate or phosphate. In any event, the pectinylic acid combines with or absorbs the calcium preferentially, to form a jelly having a final pH of about 6.55. This jelly contains very little or practically no sugar.

In the case of pectinylic acid requiring a pH value as low as 1.00 for solution of its calcium jelly, jellies are preferably prepared by calcium precipitation and in the absence of as much as 40% sugar without depending on sugar and hydrogen ion concentration for jelly formation. This pectinylic acid, preferably reduced to 100 grade with sodium citrate, sodium bicarbonate and dextrose, as disclosed hereinabove, is suitable for making custards and for stabilizing milk and cream products, such as ice cream, sherberts and soft cheese. In making sherbets and ices, tricalcium phosphate may be added last in the freezer, or it may be added with the other neutral ingredients in the freezer and the acid or fruit juices added last. A jelly formation takes place in the freezer which helps keep down the size of the ice crystals and prevents the draining of syrup away from the ice crystals in the packing or hardening cabinet.

The pectinylic acids prepared according to the present invention are characterized by a jelly grade much higher than that of the pectase treated pectins shown in the recent article by Hills, White and Baker entitled "Low Sugar Jelling Pectinates." The latter authors use one gram of pectin, 54 grams of sugar and 100 grams of water to prepare 155 grams of a calcium jelly containing about 35% sugar which is not up to the desired strength (below 50 c.m. of water). If the amounts given in this formula are multiplied by three, it will be seen that three grams of pectin yield 465 grams of substandard jelly. Three grams of pectinylic acid of the present invention, on the other hand, in combination with 100 grams sugar, 480 c.c. of water and 2.5 grams sodium citrate will yield 585 grams of a standard calcium jelly containing about 17% sugar. In other words, our pectinylic acid, at half the sugar concentration used by Hills, White and Baker, will form 585.5 grams jelly rather than the 465 grams jelly obtained from the pectase treated pectin of Hills, White and Baker, binding 480 c.c. of water rather than 300 c.c. of water bound by the pectase treated pectin shown by Hills, White and Baker.

In general, the gel forming properties of our pectinylic acids may be utilized for a great variety of purposes, such as preparing jellies with fruit juices; preparation of confections of high sugar concentrations (70 to 75% sugar solids); for the preparation of jellies of low sugar content (0 to 40%); for making milk custards; and for stabilizing sherbets and ice creams.

The aqueous solutions of pectinylic acids requiring pH values of 1.4 or less for solution of their calcium jellies are characterized by high viscosities which make these pectinylic acids useful as thickening agents to replace alginic acids, tragacanth, agar and other gums of commerce, particularly in the ice cream and sherbet field; as a sizing for fabrics; as a coating for pastries and filling for cakes; as a dessert preparation; and as a base for piping jellies and cake decorations. The highly hydrophilic properties of these pectinylic acids enable them to hold water more tenaciously than most gums and starches. Pectinylic acids requiring a pH value of 1.4 or less for solution of their calcium jellies form sodium salts which are characterized by high viscosities when dissolved in water. The 3% of a solution of such a sodium salt will set to a semi-solid jelly in distilled water at a pH of 3.00, in the same manner as the pectinylic acid itself.

It will thus be seen that the pectinylic acids containing less than 2.8% ash prepared by the methods disclosed in this application are new compounds, although calcium salts of these pectinylic acids may have been prepared heretofore. Further, we have provided a method for preparing these pectinylic acids in a form adapting the same for commercial use. More particularly, we have provided methods for preparing pectinylic acids in water soluble form and having any desired gel forming and other properties adapting the pectinylic acids for use in food products. We have, specifically, provided methods for preparing novel jellies from pectinylic acids, in which jelly formation is due principally to the formation of a calcium-pectinylic acid precipitate.

Many details of procedure and composition may be varied within a wide range without departing from the principles of this invention and it is therefore not our purpose to limit the patent granted on this invention otherwise than necessitated by the scope of the appended claims.

We claim as follows:

1. The method of preparing a pectous jelly which comprises reacting an aqueous pectin material with pectase at a pH maintained between about 5.5 and 6.5 and at a temperature below 160° F. to produce a calcium susceptible pectinylic acid, terminating said pectase reaction when a calcium jelly of the pectinylic acid so produced requires a pH of between 2.4 and 1.0 to dissolve the same, recovering from the reaction mass after such termination a pectase-free pectinylic acid containing not more than 2.8% ash and water soluble to the extent that 1 gram thereof is capable of being dissolved in 100 c. c. of water at 130° F., dissolving said resulting pectinylic acid in water containing an amount of calcium ions insufficient to form a precipitate with said pectinylic acid and introducing into the resulting solution an amount of calcium ions sufficient to effect gelation of said solution.

2. The method of preparing a pectous jelly which comprises reacting an aqueous pectin material with pectase at a pH maintained between about 5.5 and 6.5 and at a temperature below 160° F. to produce a calcium susceptible pectinylic acid, terminating said pectase reaction when a calcium jelly of the pectinylic acid so produced requires a pH of between 2.4 and 1.0 to dissolve the same, recovering from the reaction mass after such termination a pectase-free pectinylic acid containing not more than 2.8% ash and water soluble to the extent that 1 gram thereof is capable of being dissolved in 100 c. c. of water at 130° F., dissolving said resulting pectinylic acid in water containing an edible soluble salt capable of precipitating calcium and introducing into the resulting solution an amount of calcium ions sufficient to effect gelation of said solution.

3. The method of preparing a pectous jelly which comprises reacting an aqueous pectin material with pectase at a pH maintained between about 5.5 and 6.5 and at a temperature below 160° F. to produce a calcium susceptible pectinylic acid, terminating said pectase reaction when a calcium jelly of the pectinylic acid so produced requires a pH of between 2.4 and 1.0 to dissolve the same, recovering from the reaction mass after such termination a pectase-free pectinylic acid containing not more than 2.8% ash and water soluble to the extent that 1 gram thereof is capable of being dissolved in 100 c. c. of water at 130° F., dissolving said resulting pectinylic acid in water containing an amount of calcium ions insufficient to form a precipitate with said pectinylic acid and introducing into the resulting solution an amount of milk sufficient to effect gelation of said solution.

4. The method of preparing a pectous jelly which comprises reacting an aqueous pectin material with pectase at a pH maintained between about 5.5 and 6.5 and at a temperature below 160° F. to produce a calcium suspectible pectinylic acid, terminating said pectase reaction when a calcium jelly of the pectinylic acid so produced requires a pH of between 2.4 and 1.0 to dissolve the same, recovering from the reaction mass after such termination a pectase-free pectinylic acid containing not more than 2.8% ash and water soluble to the extent that 1 gram thereof is capable of being dissolved in 100 c. c. of water at 130° F., dissolving said resulting pectinylic acid in water containing an edible soluble salt capable of precipitating calcium and introducing into the resulting solution an amount of milk sufficient to effect gelation of said solution.

5. The method of preparing a pectous jelly which comprises reacting an aqueous pectin material with pectase at a pH maintained between about 5.5 and 6.5 and at a temperature below 160° F. to produce a calcium susceptible pectinylic acid, terminating said pectase reaction when a calcium jelly of the pectinylic acid so produced requires a pH of between 2.4 and 1.0 to dissolve the same, recovering from the reaction mass after such termination a pectase-free pectinylic acid containing not more than 2.8% ash and water soluble to the extent that 1 gram thereof is capable of being dissolved in 100 c. c. of water at 130° F., dissolving said resulting pectinylic acid in water containing an amount of calcium ions insufficient to form a precipitate with said pectinylic acid, introducing into the resulting solution milk at a temperature below its scalding temperature in an amount sufficient to effect gelation of said solution at room temperature and cooling said solution to room temperature.

6. The method of preparing a pectous jelly which comprises reacting an aqueous pectin material with pectase at a pH maintained between about 5.5 and 6.5 and at a temperature below 160° F. to produce a calcium susceptible pectinylic acid, terminating said pectase reaction when a calcium jelly of the pectinylic acid so produced requires a pH of between 2.4 and 1.0 to dissolve the same, recovering from the reaction mass after such termination a pectase-free pectinylic acid containing not more than 2.8% ash and water soluble to the extent that 1 gram thereof is capable of being dissolved in 100 c. c. of water at 130° F., dissolving said resulting pectinylic acid in water containing an amount of calcium ions insufficient to form a precipitate with said pectinylic acid, and introducing into the resulting solution a fruit juice containing soluble calcium salts in an amount sufficient to effect gelation of said solution.

7. The method of preparing a pectous jelly which comprises reacting an aqueous pectin material with pectase at a pH maintained between about 5.5 and 6.5 and at a temperature below 160° F. to produce a calcium susceptible pectinylic acid, terminating said pectase reaction when a calcium jelly of the pectinylic acid so produced requires a pH of between 2.4 and 1.0 to dissolve the same, recovering from the reaction mass after such termination a pectase-free pectinylic acid containing not more than 2.8% ash and water soluble to the extent that 1 gram thereof is capable of being dissolved in 100 c. c. of water at 130° F., dissolving said resulting pectinylic acid in water at a pH of between 4.5 and 7.0 and containing less than 10 parts of dissolved calcium per million, a substantial amount of an edible soluble salt capable of precipitating calcium, and a substantial amount of a calcium salt insoluble at a pH between 4.5 and 7.0 but soluble at a pH below 4.5, and lowering the pH of said solution to a pH sufficiently below 4.5 to liberate an amount of calcium ions from said calcium salt sufficient to effect gelation thereof.

8. The method of preparing a pectous jelly which comprises reacting an aqueous pectin material with pectase at a pH maintained between about 5.5 and 6.5 and at a temperature below 160° F. to produce a calcium susceptible pectinylic acid, terminating said pectase reaction when a calcium jelly of the pectinylic acid so produced requires a pH of between 2.4 and 1.0 to dissolve the same, recovering from the reaction mass after such termination a pectase-free pectinylic acid containing not more than 2.8% ash and water soluble to the extent that 1 gram thereof is capable of being dissolved in 100 c. c. of water at 130° F., dissolving said resulting pectinylic acid in hot water containing less than 10 parts of calcium per million, a substantial amount of an edible soluble salt capable of precipitating calcium, and sugar in an amount not exceeding 65% by weight of said solution, regulating the pH of said solution to lie between 4.5 and 7.0, incorporating a substantial amount of tricalcium phosphate into said solution, lowering the pH of said solution to less than 4.5 but not below 3.0, and cooling said solution to room temperature to effect gelation.

9. Pectinylic acid containing not more than 2.8% ash and water soluble to the extent that 1 gram thereof is capable of being dissolved in 100 c. c. of water at 130° F., said pectinylic acid having been produced by reacting an aqueous pectin material with pectase at a pH maintained between 5.5 and 6.5 and at a temperature below 160° F. to produce a calcium susceptible pectinylic acid, terminating said pectase reaction when a calcium jelly of the pectinylic acid so produced requires a pH of between 2.4 and 1.0 to dissolve the same and recovering from the reaction mass after such termination a pectase-free pectinylic acid such as herein above defined.

10. A dry pectase-free composition capable if dissolved in water containing not more than 10 parts of calcium per million of forming a jelly when soluble calcium is incorporated into the resulting solution, said composition consisting essentially of an effective amount of an edible soluble salt capable of precipitating calcium and pectase-free pectinylic acid containing not more than 2.8% ash and water soluble to the extent that 1 gram thereof is capable of being dissolved in 100 c. c. of water at 130° F. said pectinylic acid having been produced by reacting an aqueous pectin material with pectase at a pH maintained between 5.5 and 6.5 and at a temperature below 160° F. to produce a calcium susceptible pectinylic acid, terminating said pectase reaction when a calcium jelly of the pectinylic acid so produced requires a pH of between 2.4 and 1.0 to dissolve the same and recovering from the reaction mass after such termination a pectase-free pectinylic acid.

11. A dry pectase-free composition capable if dissolved in water containing not more than 10 parts of calcium per million of forming a jelly when soluble calcium is incorporated into the resulting solution, said composition consisting essentially of an effective amount of an edible soluble salt capable of precipitating calcium, tricalcium phosphate and pectase-free pectinylic acid containing not more than 2.8% ash and water soluble to the extent that 1 gram thereof is capable of being dissolved in 100 c. c. of water at 130° F., said pectinylic acid having been produced by reacting an aqueous pectin material with pectase at a pH maintained between 5.5 and 6.5 and at a temperature below 160° F. to produce a calcium susceptible pectinylic acid, terminating said pectase reaction when a calcium jelly of the pectinylic acid so produced requires a pH of between 2.4 and 1.0 to dissolve the same and recovering from the reaction mass after such termination a pectase-free pectinylic acid.

12. A dry pectase-free composition capable if dissolved in water containing not more than 10 parts of calcium per million of forming a jelly when soluble calcium is incorporated into the resulting solution, said composition consisting essentially of an effective amount of an edible soluble salt capable of precipitating calcium, a sufficient amount of an edible soluble salt to effect in said solution a pH of from 4.2 to 7.0 and pectase-free pectinylic acid containing not more than 2.8% ash and water soluble to the extent that 1 gram thereof is capable of being dissolved in 100 c.c. of water at 130° F., said pectinylic acid having been produced by reacting an aqueous pectin material with pectase at a pH maintained between 5.5 and 6.5 and at a temperature below 160° F. to produce a calcium susceptible pectinylic acid, terminating said pectase reaction when a calcium jelly of the pectinylic acid so produced requires a pH of between 2.4 and 1.0 to dissolve the same and recovering from the reaction mass after such termination a pectase-free pectinylic acid.

13. A dry pectase-free composition capable if dissolved in water containing not more than 10 parts of calcium per million of forming a jelly when soluble calcium is incorporated into the resulting solution, said composition consisting essentially of an effective amount of an edible soluble salt capable of precipitating calcium, tricalcium phosphate, sodium citrate, a sufficient amount of an edible salt to effect in said solution a pH of from 4.2 to 7.0 and pectase-free pectinylic acid containing not more than 2.8% ash and water soluble to the exten that 1 gram thereof is capable of being dissolved in 100 c.c. of water at 130° F., said pectinylic acid having been produced by reacting an aqueous pectin material with pectase at a pH maintained between 5.5 and 6.5 and at a temperature below 160° F. to produce a calcium susceptible pectinylic acid, terminating said pectase reaction when a calcium jelly of the pectinylic acid so produced requires a pH of between 2.4 and 1.0 to dissolve the same and recovering from the reaction mass after such termination a pectase-free pectinylic acid.

HERBERT T. LEO.
    CLARENCE C. TAYLOR.

REFERENCES CITED

The following references are of record in the file of this patent:

UNITED STATES PATENTS

| Number | Name | Date |
|---|---|---|
| 1,513,615 | Leo | Oct. 28, 1924 |
| 1,940,036 | Wilson | Dec. 19, 1933 |
| 1,991,242 | Cole et al. | Feb. 12, 1935 |
| 1,997,615 | Wallerstein et al. | Apr. 16, 1935 |
| 2,115,479 | Beach | Apr. 26, 1938 |
| 2,133,273 | Cox | Oct. 18, 1938 |
| 2,233,574 | Baker et al. | Mar. 4, 1941 |
| 2,253,389 | Mnookin | Aug. 19, 1941 |
| 2,273,527 | Joseph | Feb. 17, 1942 |
| 2,358,430 | Willaman et al. | Sept. 19, 1944 |
| 2,369,846 | Olsen | Feb. 20, 1945 |
| 2,373,729 | Willaman | Apr. 17, 1945 |
| 2,406,840 | Leo et al. | Sept. 3, 1946 |

OTHER REFERENCES

Proceed. of Food Tech., 1942, pages 47 to 58, by Hills et al.